(12) United States Patent
Shiraga et al.

(10) Patent No.: US 7,211,999 B2
(45) Date of Patent: May 1, 2007

(54) ROTATION ANGLE DETECTOR

(75) Inventors: Shozoh Shiraga, Hirakata (JP); Koji Toyota, Hirakata (JP); Tamotsu Ota, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 210 days.

(21) Appl. No.: 11/007,173

(22) Filed: Dec. 9, 2004

(65) Prior Publication Data
US 2005/0127907 A1    Jun. 16, 2005

(30) Foreign Application Priority Data
Dec. 12, 2003   (JP)   ............... 2003-414460

(51) Int. Cl.
*G01B 7/14*   (2006.01)
(52) U.S. Cl. .................................. 324/207.25
(58) Field of Classification Search ............ 324/207.25
See application file for complete search history.

(56) References Cited

U.S. PATENT DOCUMENTS

| | | | |
|---|---|---|---|
| 4,773,381 A | | 9/1988 | Koshida |
| 5,663,640 A | * | 9/1997 | Sakamoto ............ 324/173 |
| 5,781,005 A | * | 7/1998 | Vig et al. ............ 324/207.2 |
| 6,131,547 A | | 10/2000 | Weber et al. |

FOREIGN PATENT DOCUMENTS

| | | |
|---|---|---|
| EP | 0 247 567 | 12/1987 |
| JP | 11-287608 | 10/1999 |

* cited by examiner

*Primary Examiner*—Reena Aurora
(74) *Attorney, Agent, or Firm*—Wenderoth, Lind & Ponack, L.L.P.

(57) ABSTRACT

A rotation angle detector has a rotary member which is rotated in association with a steering shaft, detecting members each of which is rotated in association with the rotary member, magnets which are arranged in correspondence to these detecting members and rotated integrally with these corresponding detecting members, magnetic sensing devices which are arranged opposed to the respective corresponding magnets, and a controlling circuit for calculating a rotation angle of the steering shaft based on detection signals from the magnetic sensing devices, wherein at least one of the magnets has a first section on a side of the magnetic sensing device, and a second section on a side opposite to the magnetic sensing device, and the north pole and the south pole of the first section are arranged in a reversed manner to those of the second section.

20 Claims, 13 Drawing Sheets

ROTATION ANGLE DETECTOR

BACKGROUND OF THE INVENTION

1. Field of the Invention

The present invention relates to a rotation angle detector adapted for detecting a rotation angle of a shaft member such as a steering shaft of an automotive vehicle.

2. Description of the Related Art

In recent years, sophisticated functions have been provided in automotive vehicles, and various rotation angle detectors for detecting a rotation angle of a steering shaft have been used to execute various controls.

A conventional rotation angle detector is described referring to FIGS. 11 through 14B.

FIG. 11 is a perspective view showing essential parts of the conventional rotation angle detector, and FIG. 12 is a cross-sectional view of the conventional rotation angle detector shown in FIG. 11. Referring to FIGS. 11 and 12, a rotary member 1 formed with a spur gear portion 1A on an outer circumference thereof is mounted on a steering shaft (not shown) in a state that the gear portion 1A is meshed with a gear portion 2A formed on a first detecting member 2, and a gear portion 3A formed on a second detecting member 3. The number of teeth of the gear portion 2A is different from that of the gear portion 3A. The detecting members 2, 3 each is in the form of a spur gear.

Respective numbers of teeth of the first detecting member 2 and the second detecting member 3 are set in such a manner that the first and second detecting members 2 and 3 are returned to their initial positions thereof in mesh with the rotary member 1 when the rotary member 1 is rotated by a predetermined rotation angle, for instance, turns counterclockwise twice or turns clockwise twice from a neutral position of a steering wheel (not shown).

The rotary member 1 substantially has an annular shape with an opening formed in a central part thereof, and the steering shaft is passed through the opening. An engaging block 1B engageable with the steering shaft is mounted on an inner circumference of the annular part of the rotary member 1.

Cylindrical magnets 4, 5 are attached to respective central parts of the first detecting member 2 and the second detecting member 3 by an adhesive.

A wiring substrate 6 is mounted on upper surfaces of the first detecting member 2 and the second detecting member 3, and magnetic sensing devices 7, 8 and a controlling circuit 9 are mounted on the wiring substrate 6. Specifically, the magnetic sensing device 7 is provided on the wiring substrate 6 at a position opposing a central part of the first detecting member 2, and the magnetic sensing device 8 is provided on the wiring substrate 6 at a position opposing a central part of the second detecting member 3, respectively. The controlling circuit 9 is comprised of a microcomputer and is adapted to process output signals from the magnetic sensing devices 7, 8. The rotation angle detector is constructed as mentioned above.

As shown in FIG. 13, the magnet 4 attached to the first detecting member 2, and the magnet 5 attached to the second detecting member 3 are arranged opposed to the magnetic sensing device 7, and the magnetic sensing device 8, respectively. The magnet 4 (5) is constructed in such a manner that the north pole and the south pole thereof are located on the left side and the right side in FIG. 13, respectively. FIG. 13 is an illustration schematically showing magnetic lines of force (hereinafter, sometimes simply called as "magnetic line(s)") viewed from a side of the magnet 4 (5).

As shown in FIG. 13, the magnet 4 (5) generates various magnetic lines of force including a magnetic line AO to be detected by the magnetic sensing device 7 (8), and a magnetic line BO which is directed from a side portion of the magnet 4 5) toward counterpart magnet 5 (4).

In the above construction, when the steering shaft (not shown) turns, the rotary member 1 turns, and the first detecting member 2 and the second detecting member 3, each of which is meshed with the gear portion 1A of the rotary member 1, are rotated in accordance with this turning of the rotary member 1.

Then, the magnet 4 attached to the first detecting member 2, and the magnet 5 attached to the second detecting member 3 are rotated in association with rotations of the first detecting member 2 and the second detecting member 3, respectively. Thereby, direction of the magnetic line AO of the magnet 4 (5) is varied. The magnetic sensing device 7 (8) detects variation of the direction of the magnetic line AO, and outputs a voltage depending on the variation.

Since the number of teeth of the first detecting member 2 is different from that of the second detecting member 3, as shown in voltage waveform diagrams of FIGS. 14A and 14B, a rotation angle of the first detecting member 2 and a rotation angle of the second detecting member 3 are different from each other when the rotary member 1 is rotated by a rotation angle θ. As a result, the direction of the magnetic line AO from the magnet 4 is different from the direction of the magnetic line AO from the magnet 5 when the rotary member 1 is rotated by the rotation angle θ, and voltage V1 outputted from the magnetic sensing device 7 is different from voltage V2 outputted from the magnetic sensing device 8, as shown in FIG. 14A and FIG. 14B.

The rotation angle detector is constructed such that a rotation angle of the rotary member 1, namely, a rotation angle of the steering shaft is obtained by causing the controlling circuit 9 to execute a predetermined computation based on a difference between the voltages V1 and V2, and the respective numbers of teeth of the first and second detecting members 2 and 3.

An example of the conventional rotation angle detector is disclosed, for example, in Japanese Unexamined Patent Publication No. 11-287608.

In the conventional rotation angle detector, the magnets 4, 5 each generating a strong magnetic force is used in an attempt to securely detect the direction of the magnetic line AO. In such a case, it is highly likely that a rotation angle detected by the magnetic sensing device 7 (8) may include detection errors, because the magnetic line BO, which is directed from a side portion of the counterpart magnet 5 (4) that is disposed horizontally away from the magnet 4 (5) toward the magnet 4 (5), may affect the direction of the magnetic line AO generated in the magnet 4 (5).

SUMMARY OF THE INVENTION

In view of the problems residing in the prior art, an object of the present invention is to provide a rotation angle detector that enables to be detected a rotation angle of a shaft member with less detection errors and with high precision.

A rotation angle detector according to an aspect of the present invention is adapted for detecting a rotation angle of a shaft member, and comprises: a rotary member which is rotated in association with the shaft member; a plurality of detecting members each of which is rotated in association with the rotary member; a plurality of magnets which are arranged in correspondence to the respective detecting members and are rotated integrally with these respective corresponding detecting members; a plurality of magnetic sensing devices which are arranged opposed to the magnets, respectively; and a controlling circuit which calculates a rotation angle of the shaft member based on detection signals outputted from the magnetic sensing devices, wherein at least one of the magnets includes a first section on a side of the magnetic sensing device, and a second section on a side opposite to the magnetic sensing device, and the north pole and the south pole of the first section are arranged in a reverse manner to those of the second section.

In the above arrangement, magnetic lines directed from the north pole of the first section are significantly magnetically attracted to the south pole of the second section, or magnetic lines directed from the north pole of the second section are significantly magnetically attracted to the south pole of the first section. Thereby, magnetic force directed from a side portion of the magnet toward a counterpart magnet is weakened. This arrangement enables to be suppressed counteraction of a magnetic force between the magnetic sensing devices, which may affect variation of the direction of the magnetic lines, and thus, provided is a rotation angle detector for detecting the rotation angle of the shaft member with less detection errors and with high precision.

These and other objects, features and advantages of the present invention will become more apparent upon a reading of the following detailed description along with the accompanying drawings.

DETAILED DESCRIPTION OF THE PREFERRED EMBODIMENTS

In the following, preferred embodiments of the present invention are described referring to FIGS. 1 through 10.

Figure 1:
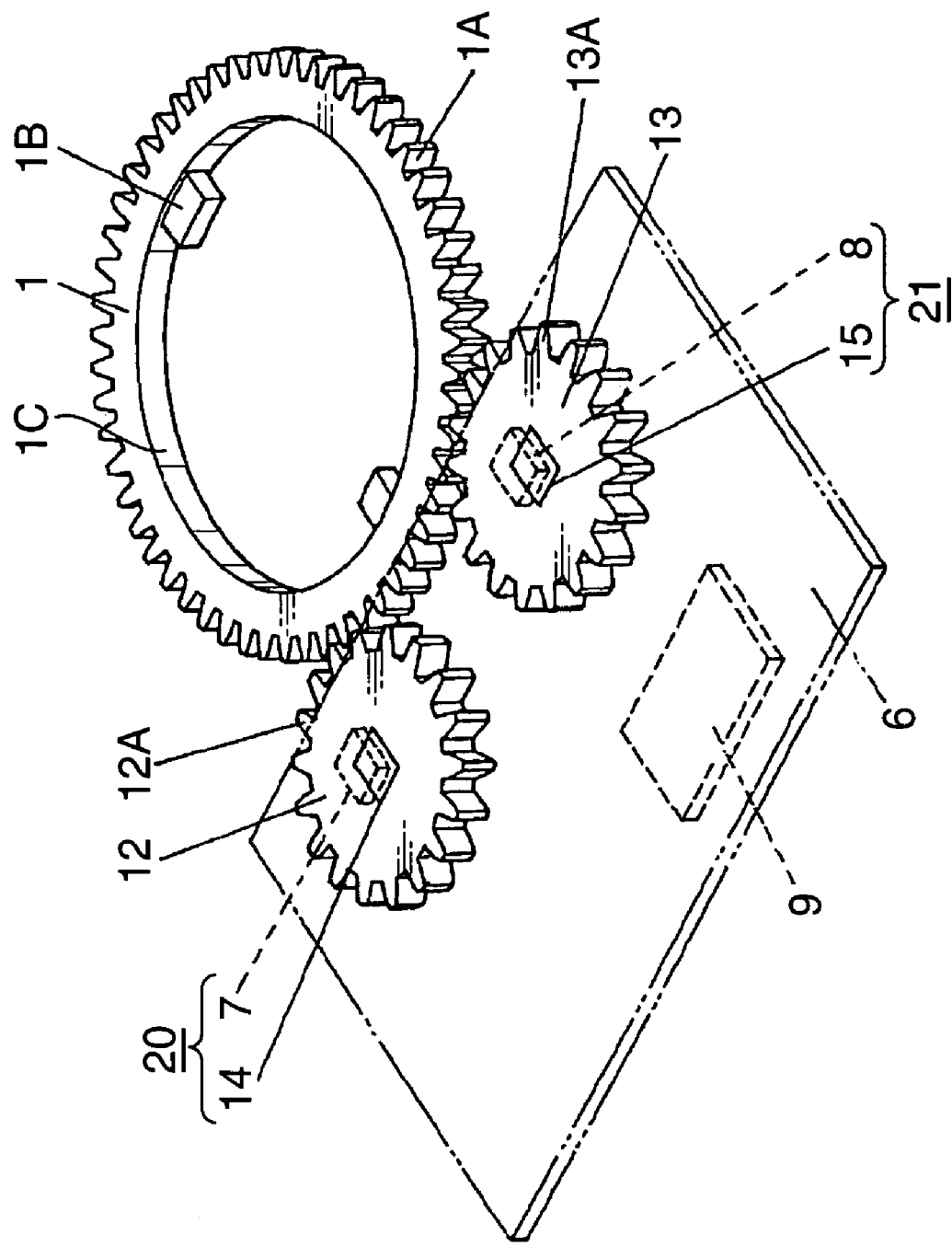
FIG. 1 is a perspective view showing essential parts of a rotation angle detector as an embodiment of the present invention.
Figure 2:
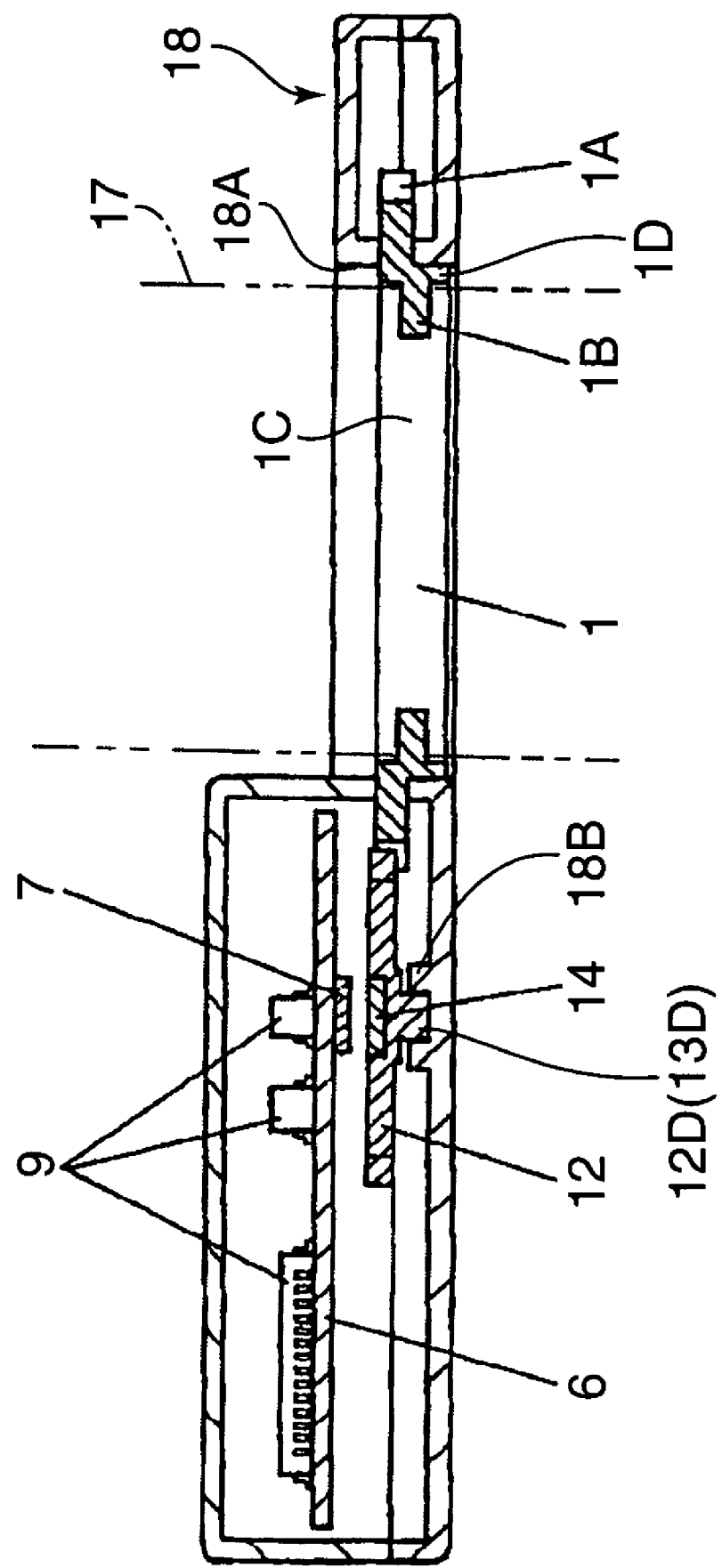
FIG. 2 is a cross-sectional view of the rotation angle detector as the embodiment of the present invention.

FIG. 1 is a perspective view showing essential parts of a rotation angle detector as an embodiment of the present invention, and FIG. 2 is a cross-sectional view of the rotation angle detector. As shown in FIGS. 1 and 2, the rotation angle detector is adapted to detect a rotation angle of a steering shaft 17 of an automotive vehicle, and includes a housing 18, and a rotary member 1 pivotally supported on the housing 18.

As shown in FIG. 2, the rotary member 1 has a cylindrical part 1D. The rotary member 1 is pivotally rotatable on the housing 18 by passing the cylindrical part 1D into a through-hole 18A formed in the housing 18.

A gear portion 1A is formed on an outer circumference of the rotary member 1. A gear portion 12A formed on a first detecting member 12, and a gear portion 13A formed on a second detecting member 13 are each meshed with the gear portion 1A of the rotary member 1, with a number of teeth of the gear portion 12A being different from that of the gear portion 13A. The rotary member 1, the first detecting member 12, and the second detecting member 13 are each in the form of a spur gear.

The first and second detecting members 12 and 13 are provided in the housing 18. A cylindrical pivotal portion 12D (13D) protrudes from a central part on a lower surface of the first detecting member 12 (second detecting member 13). The pivotal portion 12D (13D) is fitted in a boss 18B formed on a bottom portion of the housing 18. In this arrangement, the first detecting member 12, and the second detecting member 13 are pivotally supported in the housing 18, respectively.

Respective numbers of teeth of the first and second detecting members 12 and 13 are set in such a manner that the first and second detecting members 12 and 13 are returned to their initial positions thereof in mesh with the rotary member 1 when the rotary member 1 is rotated by a predetermined rotation angle, for instance, turns counterclockwise twice or turns clockwise twice from a neutral position of a steering wheel (not shown).

A large opening 1C is formed in a central part of the rotary member 1. The opening 1C has such a size as to pass the steering shaft 17 therethrough. A radially inwardly protruding engaging block 1B is mounted on an inner circumference of an annular part of the rotary member 1 in such a manner that the steering shaft 17 passing through the opening 1C engages the rotary member 1 by the engaging block 1B. In this arrangement, the rotary member 1 is integrally rotatable with the steering shaft 17.

Figure 3:
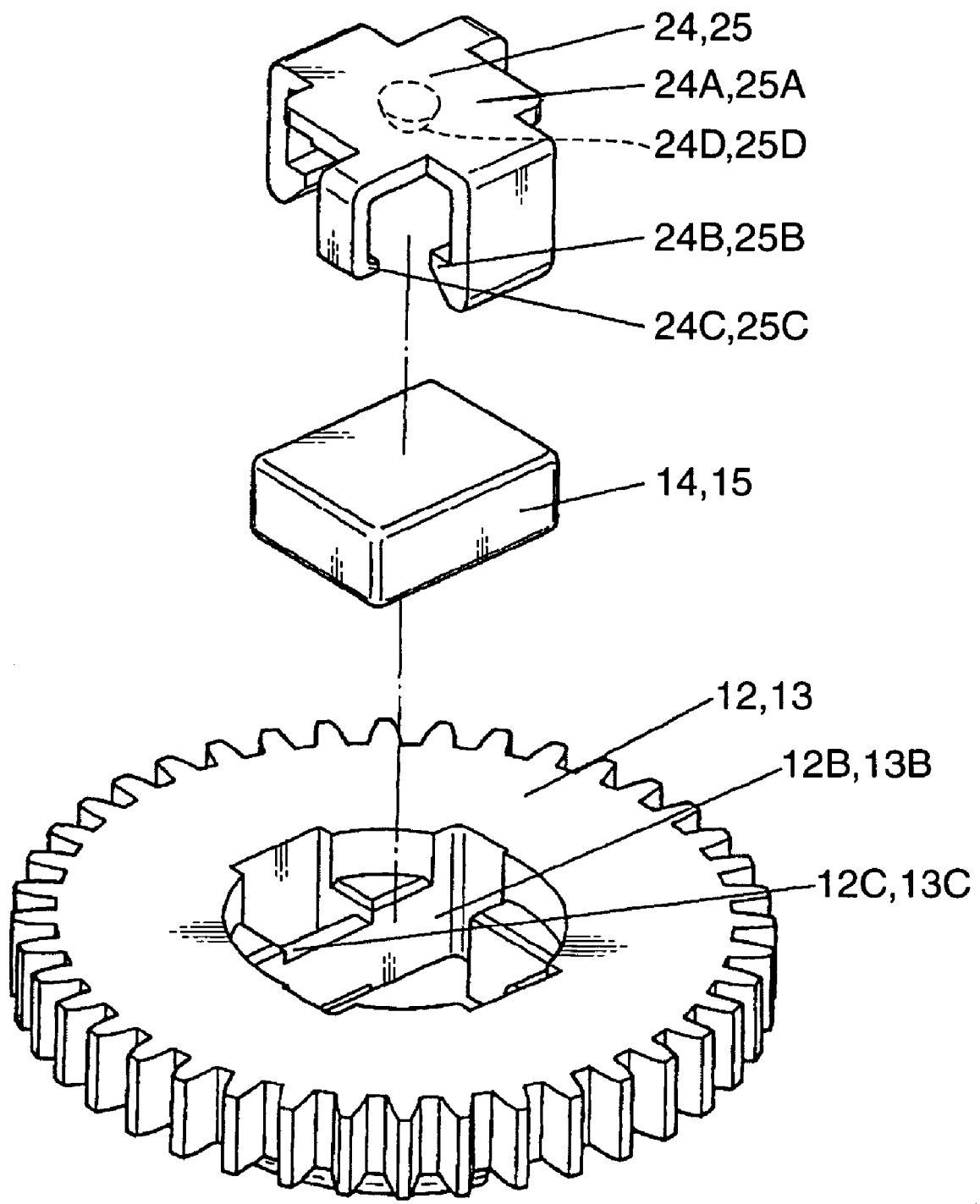
FIG. 3 is an exploded perspective view of a detecting member, a magnet, and a magnet holding member constituting the rotation angle detector before being assembled.

FIG. 3 is a perspective view showing the first detecting member 12 (the second detecting member 13), a magnet 14 to be mounted in the first detecting member 12 (a magnet 15 to be mounted in the second detecting member 13), and a magnet holding member 24 for fixedly holding the magnet 14 (a magnet holding member 25 for fixedly holding the magnet 15). The magnet 14 (15) generally has a flat shape with a large width compared to a thickness thereof. The magnet 14 (15) is a rare earth magnet, for example.

A recessed part 12B (13B) is formed in a central part of the first detecting member 12 (second detecting member 13). The recessed part 12B (13B) has a slightly larger area than that of the magnet 14 (15).

The magnet 14 (15) is fixedly held in the recessed part 12B (13B) of the first detecting member 12 (second detecting member 13) by the magnet holding member 24 (25). The magnet holding member 24 (25) is made of a non-magnetized material, and includes an upper pressing portion 24A (25A) having a rectangular shape in plan view, hook portions 24B (25B) extending downwardly from longitudinal end portions of the upper pressing portion 24A (25A), respectively, and side pressing portions 24C (25C) extending downwardly from widthwise end portions of the upper pressing portion 24A (25A), respectively. In this embodiment, the upper pressing portion 24A (25A) serves as a base portion having such a shape as to match the shape of the magnet 14 (15) in plan view.

The hook portions 24B (25B) in pair extend from the longitudinal end portions of the upper pressing portion 24A (25A), respectively. In other words, the upper pressing portion 24A (25A) connects upper end portions of the hook portions 24B (25B) with each other. Lower end portions of the hook portions 24B (25B) each is bent inwardly to be locked in a corresponding hook locking portion 12C (13C) formed in the first detecting member 12 (second detecting member 13), whereby the hook portions 24B (25B) are locked in the hook locking portions 12C (13C), respectively. Thus, the magnet holding member 24 (25) is fixedly held on the first detecting member 12 (second detecting member 13).

The side pressing portions 24C (25C) in pair extend from widthwise end portions of the upper pressing portion 24A (25A). In other words, the upper pressing portion 24A (25A) connects upper end portions of the side pressing portions 24C (25C) with each other.

The upper pressing portion 24A (25A) has a downwardly protruding projection 24D (25D) at a lower surface thereof. The projection 24D (25D) is resiliently pressed against an upper surface of the magnet 14 (15) in a state that the hook portions 24B (25B) are locked in the hook locking portions 12C (13C) in a slightly flexed state. The magnet holding member 24 (25) pressingly holds the magnet 14 (15) against a bottom wall of the recessed portion 12B (13B) in a state that a central part of the upper pressing portion 24A (25A) is flexed slightly upwardly.

Figure 4:
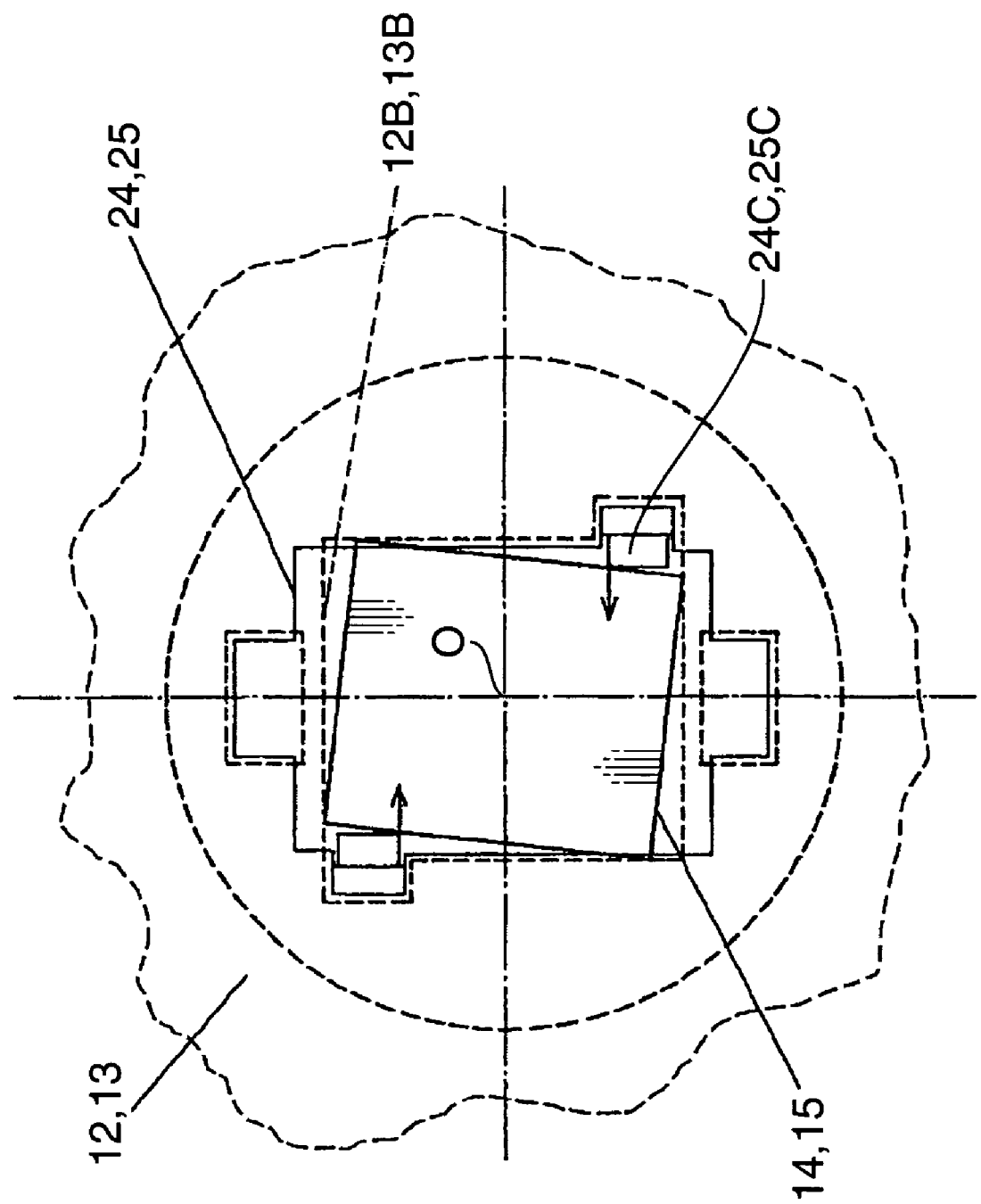
FIG. 4 is a plan view showing a state that the magnet is held in the detecting member of the rotation angle detector.

As shown in FIG. 4 depicting the first detecting member 12 (second detecting member 13) in plan view, the side pressing portions 24C (25C) are arranged in the vicinity of diagonally opposed corner portions of the magnet 14 (15), respectively. The magnet 14 (15) is inwardly pressed against opposing side walls of the recessed portion 12B (13B) by the side pressing portions 24C (25C), respectively.

Specifically, the magnet 14 (15) is inwardly pressed by the side pressing portions 24C (25C) in the vicinity of an upper left end corner and a lower right end corner of the magnet 14 (15) in FIG. 4, respectively, namely, at diagonal positions in opposing and substantially parallel directions to each other.

More specifically, the upper left end corner (the front left end corner) of the magnet 14 (15) in FIG. 4 is pressed in a rightward direction shown by an arrow in FIG. 4 by a corresponding side pressing portion 24C (25C), with an upper right end corner (the front right end corner) of the magnet 14 (15) being pressed against an upper right wall of the recessed part 12B (13B), and the lower right end corner (the rear right end corner) of the magnet 14 (15) in FIG. 4 is pressed in a leftward direction shown by the other arrow in FIG. 4 by a corresponding side pressing portion 24C (25C), with a lower left end corner (the rear left end corner) of the magnet 14 (15) being pressed against a lower left wall of the recessed part 12B (13B). With this arrangement, the magnet 14 (15) is securely held in the recessed part 12B (13B) without displacement with respect to an axial center O.

Figure 5:
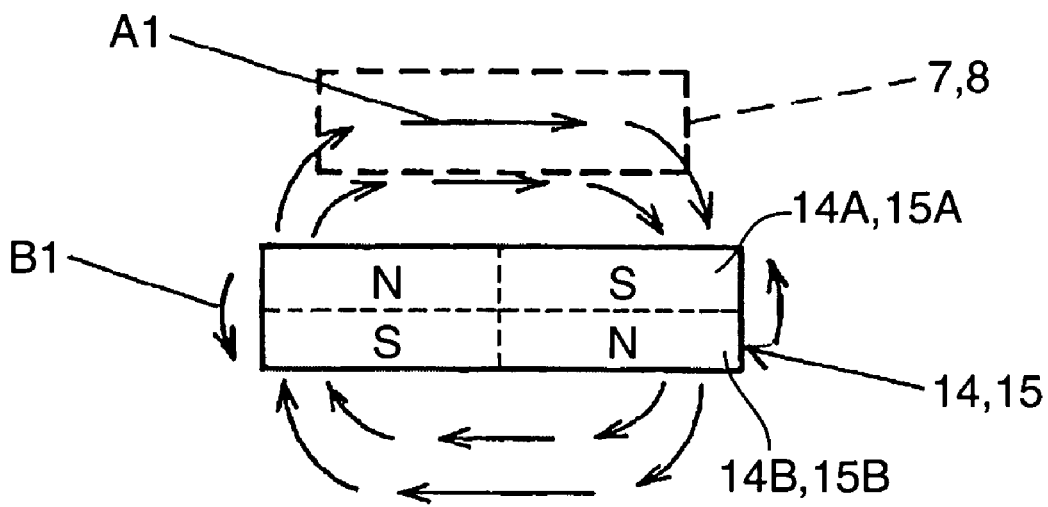
FIG. 5 is a characteristic diagram schematically showing directions of magnetic lines of force viewed from a side of the magnet.

FIG. 5 is a diagram schematically showing directions of magnetic lines of force on the magnet 14 (15) viewed from a side of the magnet 14 (15). As shown in FIG. 5, the magnet 14 (15) comprises an upper section 14A (15A), and a lower section 14B (15B) in such a manner that the north pole and the south pole of the upper section 14A (15A) are arranged in a reverse manner to those of the lower section 14B (15B). For instance, as shown in FIG. 5, the north pole of the upper section 14A (15A) is located on the left side, and the south pole thereof is located on the right side, whereas the north pole of the lower section 14B (15B) is located on the right side, and the south pole thereof is located on the left side. A magnetic sensing device 7 (8), which will be described later, is arranged above the upper section 14A (15A).

As shown in FIGS. 1 and 2, a wiring substrate 6 is provided in the housing 18 substantially parallel to the first and second detecting members 12 and 13. A number of wiring patterns (not shown) is fabricated on each side of the wiring substrate 6. The wiring substrate 6 is arranged above the first and second detecting members 12 and 13 by a certain distance.

The magnetic sensing device 7 such as an anisotropic magneto-resistance (AMR device) is mounted on a lower surface of the wiring substrate 6 at a position opposing a central part of the first detecting member 12. The magnetic sensing device 7, and the magnet 14 arranged as opposed to the magnetic sensing device 7 constitute a first detecting unit 20.

Similarly to the first detecting unit 20, a magnetic sensing device 8 such as an AMR device is mounted on the lower surface of the wiring substrate 6 at a position opposing a central part of the second detecting member 13. The magnetic sensing device 8, and the magnet 15 arranged as opposed to the magnetic sensing device 8 constitute a second detecting unit 21.

A controlling circuit 9 constituted of a microcomputer is fabricated on the wiring substrate 6. The controlling circuit 9 is connected with the magnetic sensing device 7 of the first detecting section 20 and with the magnetic sensing device 8 of the second detecting section 21, and is also connected with an electronic circuit (not shown) of an automotive vehicle which has the rotation angle detector on board. In this way, the rotation angle detector is constructed.

Now, operations and effects of the rotation angle detector are described. Referring to FIG. 5, the magnet 14 (15) generates various magnetic lines of force including a magnetic line A1 to be detected by the magnetic sensing device 7 (8), and a magnetic line B1 other than the magnetic line A1, which is directed from a side portion of the magnet 14 (15) and is undetectable by the magnetic sensing device 7 (8). Since the magnet 14 (15) is constituted of the upper section 14A (15A) and the lower section 14B (15B), the magnetic line B1 directed from the north pole of the upper section 14A (15A) (upper-side north pole) is significantly magnetically attracted to the south pole of the lower section 14B (15B) right below or beneath the upper-side north pole, and a magnetic line directed from the north pole of the lower section 14B (15B) (lower-side north pole) is significantly magnetically attracted to the south pole of the upper section 14A (15A) right above or on the lower-side north pole.

Thereby, a magnetic force directed from the side portion of the magnet 14 (15) toward counterpart magnet 15 (14) is weakened. This arrangement enables to be reduced influence of the magnetic line B1 directed from the side portion of the magnet 14 (15) of the first detecting unit 20 (second detecting unit 21) on variation of the direction of the magnetic line A1 to be detected by the magnetic sensing device 8 (7) of the second detecting unit 21 (first detecting unit 20).

Figure 6:
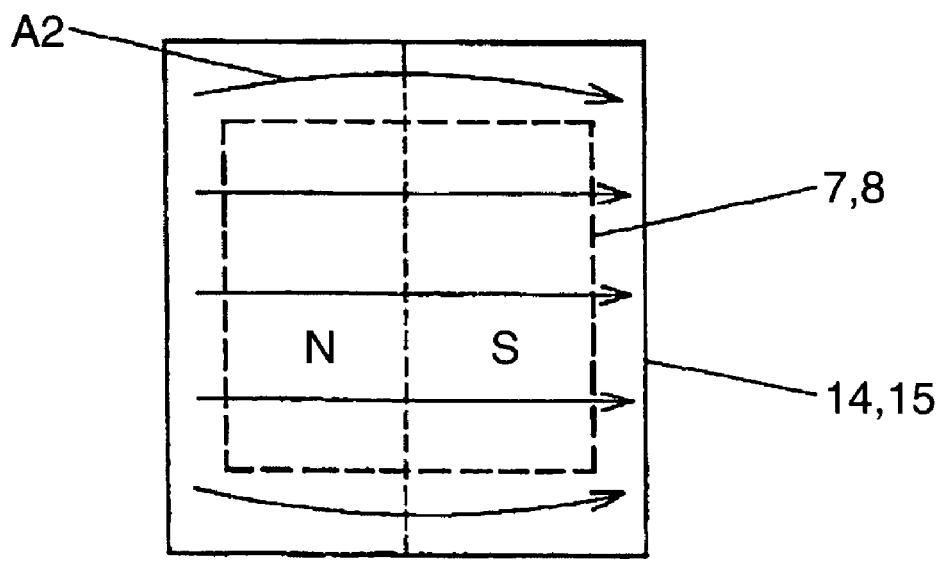
FIG. 6 is an illustration schematically showing magnetic lines of force on a rectangular parallelepiped magnet viewed from above.
Figure 7:
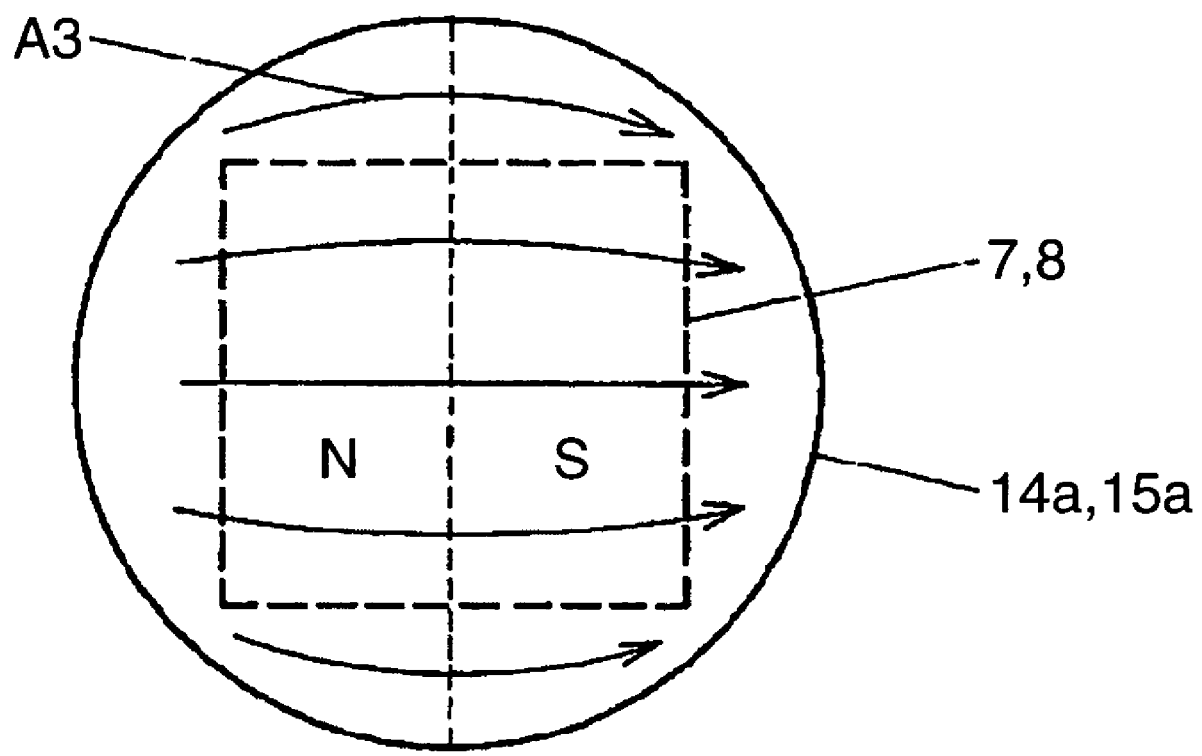
FIG. 7 is an illustration schematically showing magnetic lines of force on a cylindrical magnet viewed from above.
Figure 8:
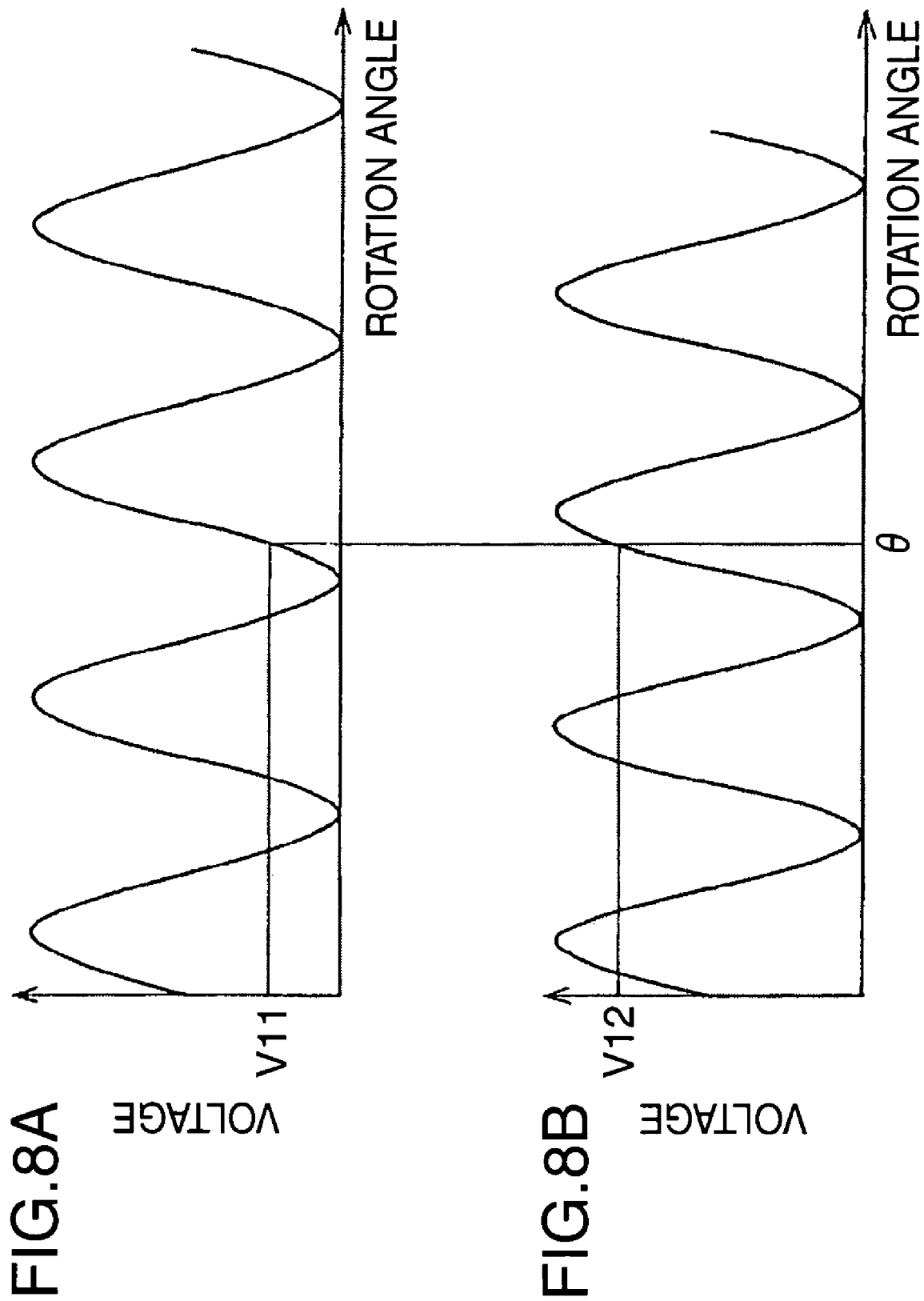
FIG. 8A is a characteristic diagram showing a voltage waveform outputted from a first detecting unit constituting the rotation angle detector.
FIG. 8B is a characteristic diagram showing a voltage waveform outputted from a second detecting unit constituting the rotation angle detector.

FIGS. 6 and 7 are illustrations schematically showing lines of magnetic force on the magnet viewed from above. FIG. 6 shows a case that the magnet is a magnet 14 (15) in the shape of a rectangular parallelepiped, and FIG. 7 shows a case that the magnet is a magnet 14*a* (15*a*) in the shape of a cylinder. As shown in FIGS. 6 and 7, whereas magnetic lines of force on the magnet 14 (15, 14*a*, 15*a*) are directed substantially straightforward, as far as they pass an axial center of the magnet or near the axial center, directions of magnetic lines of force passing away from the axial center of the magnet are likely to be affected by a contour of a corner portion of the magnet.

For instance, in the case of the magnet 14 (15) having a shape of a rectangular parallelepiped, if the north pole of the magnet 14 (15) is located on the left side, and the south pole of the magnet 14 (15) is located on the right side, a magnetic line A2 of the magnet 14 (15) is directed over an upper surface of the magnet 14 (15) in a rightward direction, as shown in FIG. 6. When the magnetic line A2 passes over the upper surface of the magnet 14 (15), merely the magnetic line A2 passing in the vicinity of the corner portion of the magnet 14 (15) is slightly curved. On the other hand, in the case of the cylindrical magnet 14*a* (15*a*), as shown in FIG. 7, not only a magnetic line A3 passing near a corner portion of the magnet 14*a* (15*a*) but also magnetic lines passing slightly away from an axial center of the magnet 14*a* (15*a*) are likely to be curved. As the magnetic line passes closer to the corner portion of the magnet 14*a* (15*a*), the magnetic line is curved greatly.

As compared with the case of the cylindrical magnet 14*a* (15*a*) having substantially the same size as the rectangular parallelepiped magnet 14 (15), magnetic lines of the magnet 14 (15) passing near the corner portion thereof are less likely to be curved. Accordingly, even if axial misalignment of the magnet 14 (15) relative to the magnetic sensing device 7 (8) occurs, variation of the direction of the magnetic lines to be detected by the magnetic sensing device 7 (8) can be suppressed. Thus, use of the rectangular parallelepiped magnet 14 (15) is advantageous in eliminating or reducing detection errors in the rotation angle of the shaft member, as compared with the case of using the cylindrical magnet 14*a* (15*a*).

In the above arrangement, when the steering shaft 17 is rotated, the rotary member 1 is rotated, and the first detecting member 12 and the second detecting member 13, each of which is meshed with the gear portion 1A of the rotary member 1, are rotated. As the first and second detecting members 12 and 13 are rotated, the magnet 14 mounted in the first detecting member 12, and the magnet 15 mounted in the second detecting member 13, are rotated integrally with the first detecting member 12, and the second detecting member 13, respectively. As the magnet 14 (15) is rotated, the direction of the magnetic line A1 of the magnet 14 (15) is varied, and the magnetic detecting member 7 (8) detects a variation of the direction of the magnetic line A1, and outputs a voltage depending on this detection result.

FIG. 8A is a waveform diagram showing variation of a voltage V11 outputted from the magnetic sensing device 7, and FIG. 8B is a waveform diagram showing variation of a voltage V12 outputted from the magnetic sensing device 8. As mentioned above, since the numbers of teeth of the first detecting member 12 and the second detecting member 13 are different from each other, the rotation angle of the first detecting member 12 is different from that of the second detecting member 13 when the rotary member 1 is rotated by a predetermined rotation angle θ. As a result, the direction of the magnetic line A1 of the magnet 14 is different from that of the magnet 15. Accordingly, as shown in the waveform diagrams of FIGS. 8A and 8B, the voltage V11 outputted from the magnetic sensing device 7 is different from the voltage V12 outputted from the magnetic sensing device 8.

In the above arrangement, the rotation angle θ of the rotary member, namely, the rotation angle of the steering shaft 17 can be obtained by causing the controlling circuit 9 to execute computation based on a difference between the voltages V11 and V12, and the respective numbers of teeth of the first and second detecting members 12 and 13.

In the foregoing embodiment, the magnet 14 (15) arranged in the central part of the first detecting member 12 (second detecting member 13) which is rotated in association with the steering shaft 17 is comprised of the upper section 14A (15A), and the lower section 14B (15B), and the north pole and the south pole of the upper section 14A (15A) are arranged in a reverse manner to those of the lower section 14B (15B). In this arrangement, the magnetic line B1 from the north pole of the upper section 14A (15A) is significantly magnetically attracted to the south pole of the lower section 14B (15B) right below or beneath the upper-side north pole, and the magnetic line from the north pole of the lower section 14B (15B) is significantly magnetically attracted to the south pole of the upper section 14A (15A) right above or on the lower-side north pole. Accordingly, the magnetic lines of force directed from the side portion of the magnet 14 (15) toward the counterpart magnet 15 (14) can be weakened, and counteraction of a magnetic force between the first and second detecting units 20 and 21, which may vary the direction of the magnetic line A1 of the counterpart magnet, can be suppressed, whereby a rotation angle detector for detecting the rotation angle of the shaft member with less detection errors and with high precision is produced.

In the embodiment, since the magnet 14 (15) has a shape of a rectangular parallelepiped, as compared with the cylindrical magnet 14*a* (15*a*) having substantially the same size as the magnet 14 (15), the magnetic lines of the magnet 14 (15) passing in the vicinity of the corner portion thereof are less likely to be curved. Accordingly, even if axial misalignment of the magnet 14 (15) relative to the magnetic sensing device 7 (8) occurs, this arrangement can minimize variation of the direction of the magnetic lines arising from such a misalignment. As a result, as compared with the case of using the cylindrical magnet 14 (15), this arrangement can reduce detection errors in the rotation angle of the shaft member.

Further, in the embodiment, the magnet 14 (15) is fixedly held in the recessed portion 12B (13B) formed in the central part of the first detecting member 12 (second detecting member 13), with the side walls of the magnet 14 (15) being pressed against the side walls of the recessed portion 12B (13B) by the side pressing portions 24C (25C) of the magnet holding member 24 (25) at substantially diagonal positions. This arrangement makes it possible to securely hold the magnet 14 (15) in the first detecting member 12 (second detecting member 13) without axial misalignment of the magnet 14 (15) relative to the first detecting member 12 (second detecting member 13).

Further, since the side pressing portions 24C (25C) are integrally formed on the magnet holding member 24 (25), the rotation angle detector can be produced with a fewer number of parts. Furthermore, since the hook portions 24B (25B) and the side pressing portions 24C (25C) extend in directions orthogonal to each other, the magnet 14 (15) is kept from being displaced relative to the first detecting member 12 (second detecting member 13) by the side pressing portions 24C (25C), and is fixedly held in the first detecting member 12 (second detecting member 13) by the hook portions 24B (25B) in a simplified construction.

In the embodiment, the first and second detecting members 12 and 13 each in the form of a spur gear, and the wiring substrate 6 are arranged substantially parallel to each other, and the magnetic sensing device 7 (8) is mounted on the wiring substrate 6 at such a position as opposed to the magnet 14 (15). This arrangement enables to be efficiently detected directions of the magnetic lines of force in a compact arrangement.

Figure 9:
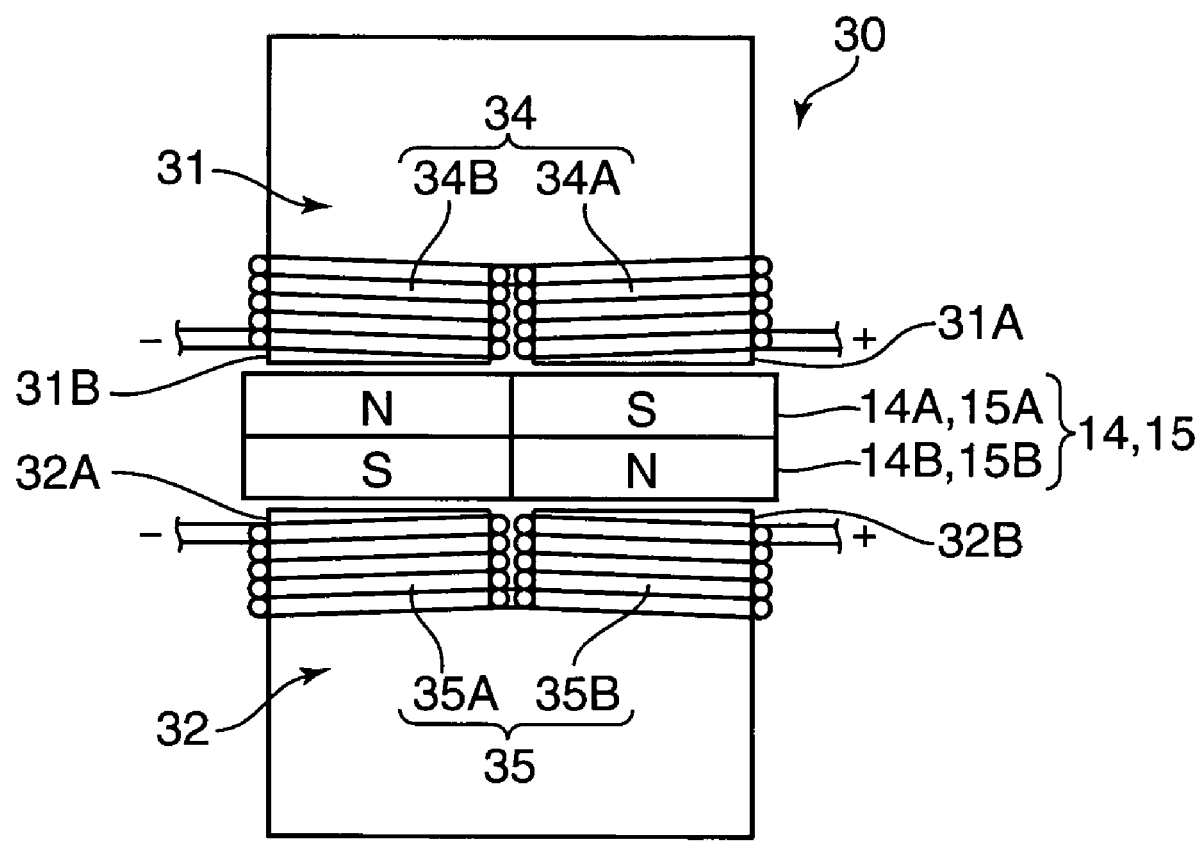
FIG. 9 is an illustration for explaining how the magnet is polarized.

In the following, described is how the magnet 14 (15) is polarized. As shown in FIG. 9, the magnet 14 (15) is polarized by a polarizing device 30. Specifically, the polarizing device 30 comprises a pair of upper and lower yokes 31, 32 between which the magnet 14 (15) is interposed, and a pair of coils 34, 35 wound around the upper yoke 31, lower yoke 32, respectively. The coil 34 (35) is comprised of coil sections 34A and 34B (35A and 35B) whose winding directions are opposite to each other. The coil 34 (35) is formed by connecting right-handed coil section 34A (35A) with left-handed coil section 34B (35B) in series. A pair of winding portions 31A and 31B (32A and 32B) protrude from the yoke 31 (32) downward (upward), respectively. The right-handed coil section 34A (35A) is wound around the winding portion 31A (32A), and the left-handed coil section 34B (35B) is wound around the winding portion 31B (32B). In this way, the left-handed coil section 34B and the right-handed coil section 34A are formed side by side on the left side and the right side in FIG. 9, respectively, when viewed from a side of the magnet 14 (15), and the right-handed coil section 35A and the left-handed coil section 35B are formed side by side on the left side and the right side in FIG. 9, respectively, when viewed from a side of magnet 14 (15).

With this arrangement, a north pole and a south pole are formed on the left side and the right side of an upper section 14A (15A) of the magnet 14 (15) in FIG. 9, and a south pole and a north pole are formed on the left side and the right side of a lower section 14B (15B) of the magnet 14 (15) in FIG. 9 by energizing the coils 34 and 35 simultaneously. In this way, the magnet 14 (15) formed with the upper section 14A (15A) and the lower section 14B (15B) having the north pole and the south pole in a reverse manner to each other is produced.

Figure 10:
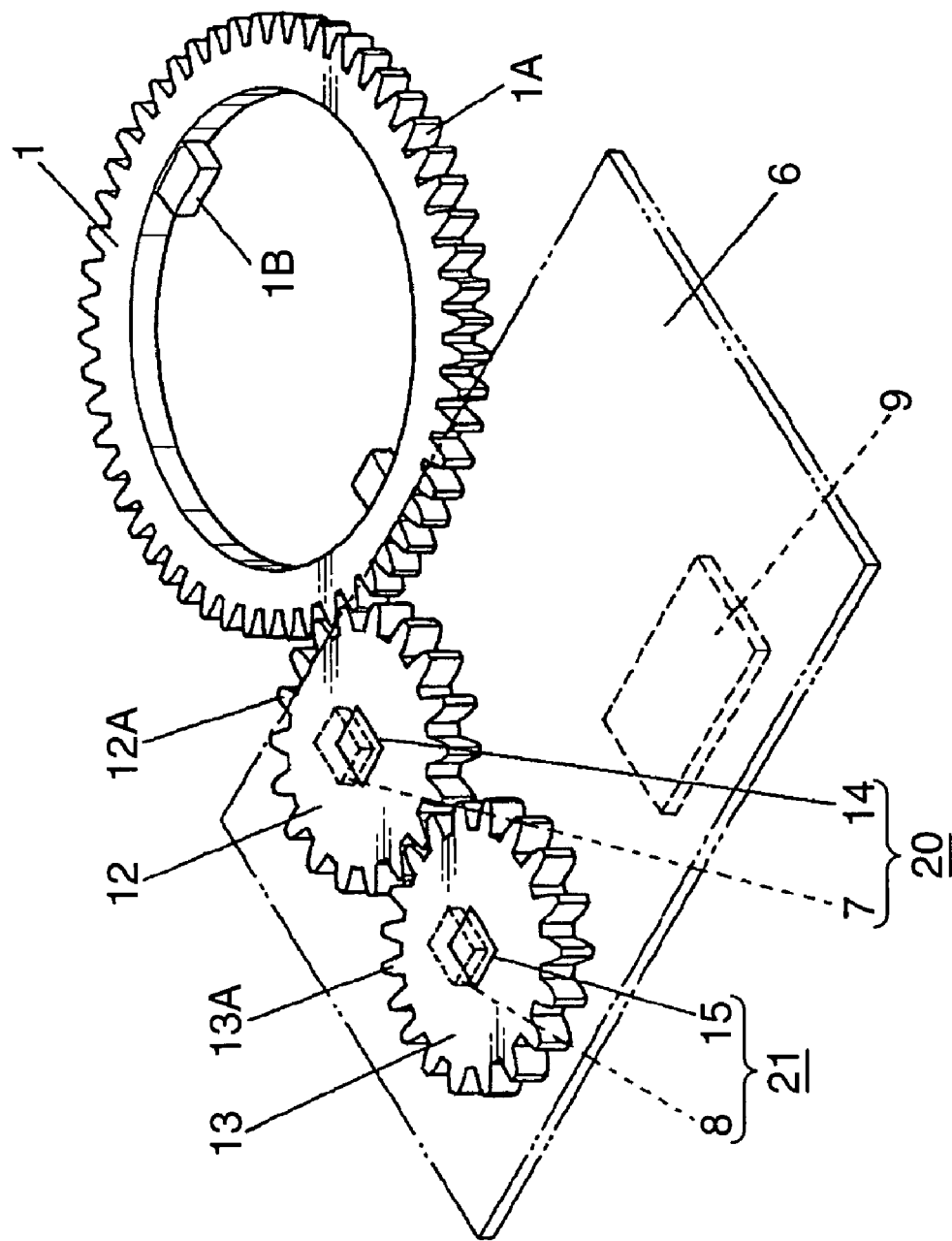
FIG. 10 is a perspective view showing essential parts of a rotation angle detector as another embodiment of the present invention.
Figure 11:
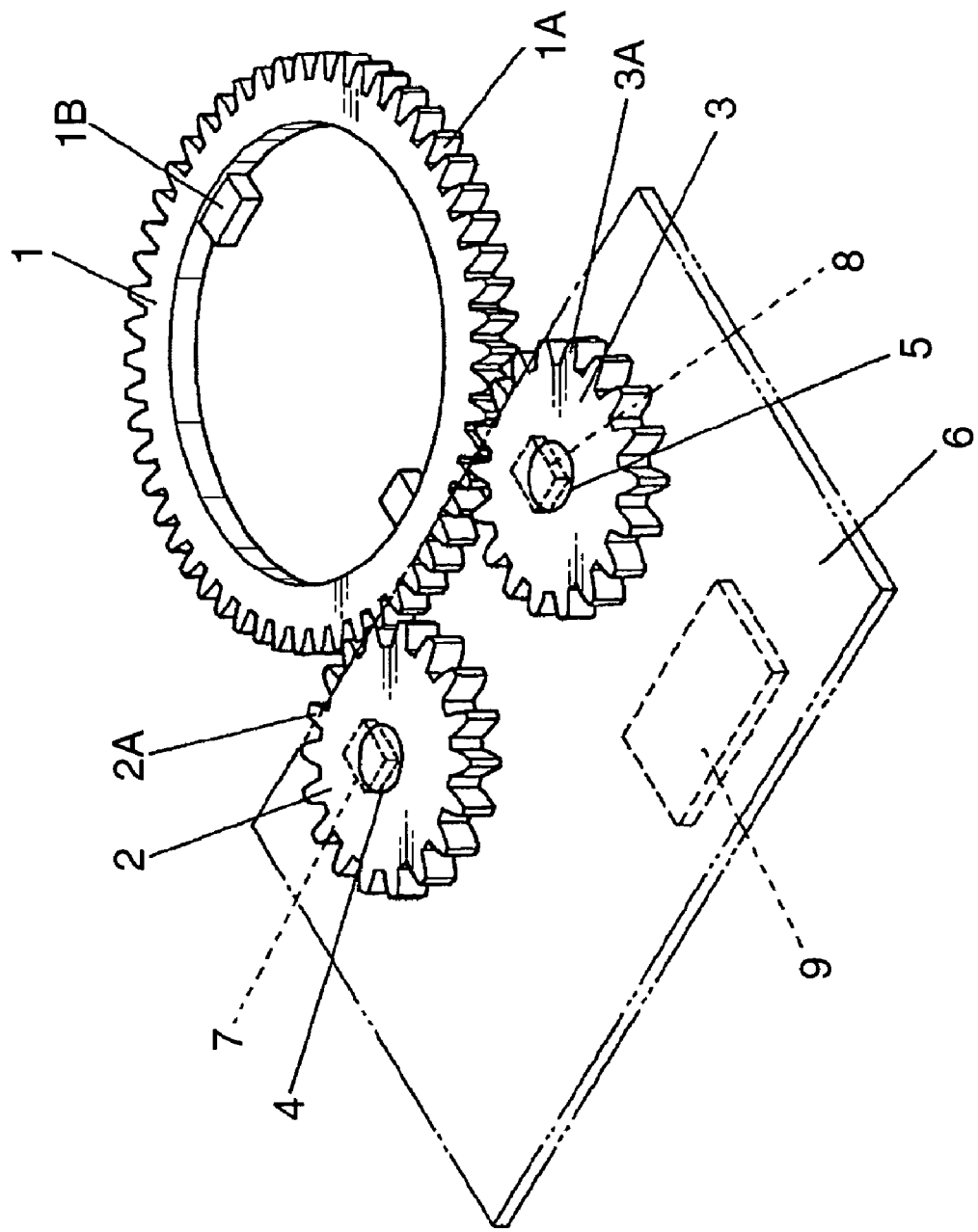
FIG. 11 is a perspective view showing essential parts of a conventional rotation angle detector.
Figure 12:
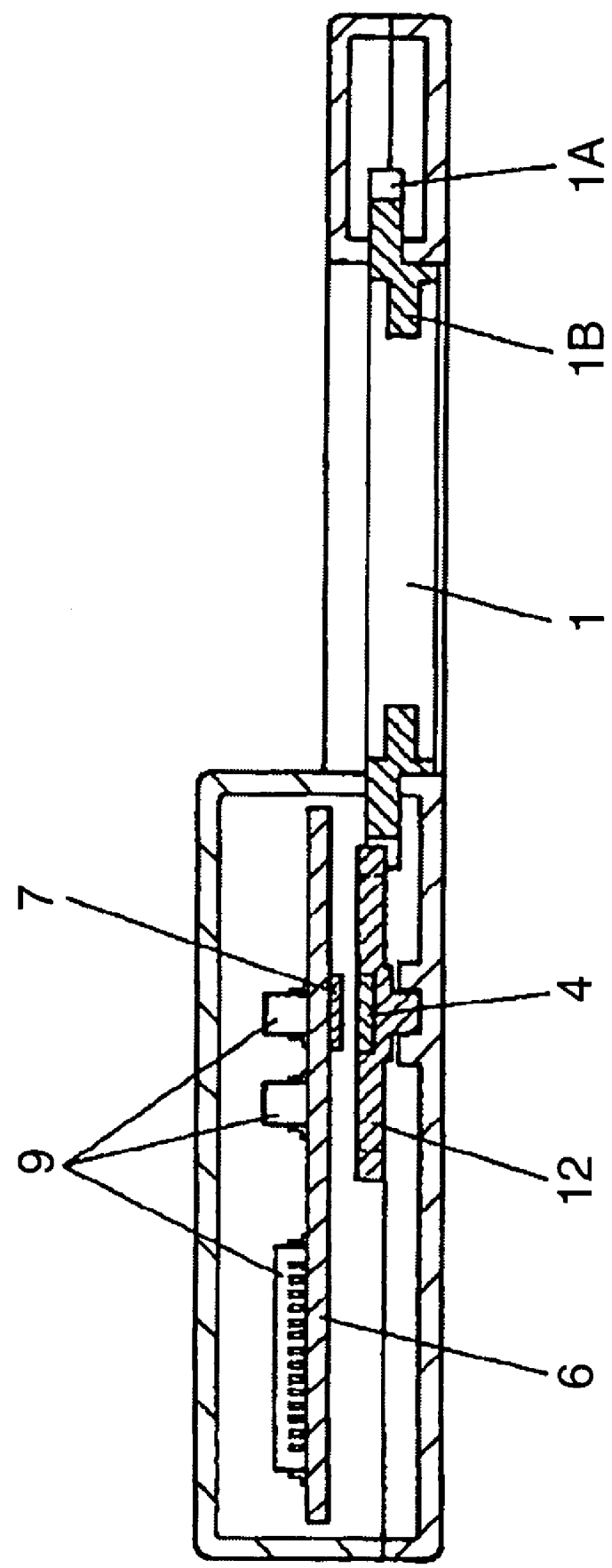
FIG. 12 is a cross-sectional view of the conventional rotation angle detector.
Figure 13:
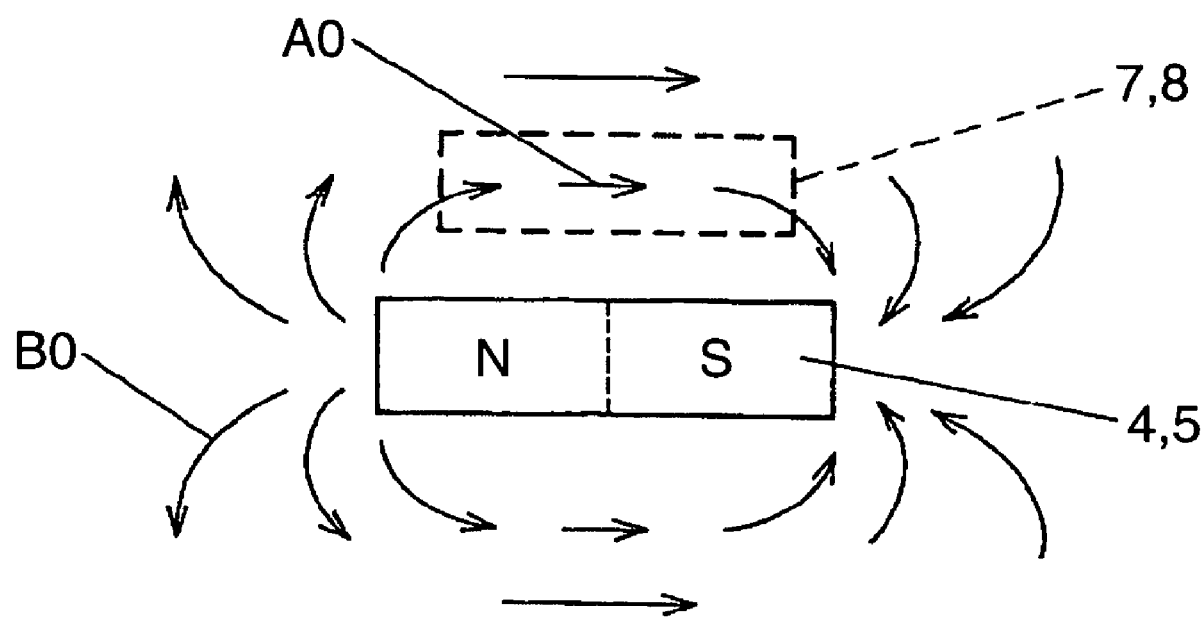
FIG. 13 is a characteristic diagram schematically showing magnetic lines of force on a magnet used in the conventional rotation angle detector viewed from a side of the magnet.
Figures 14A, 14B:
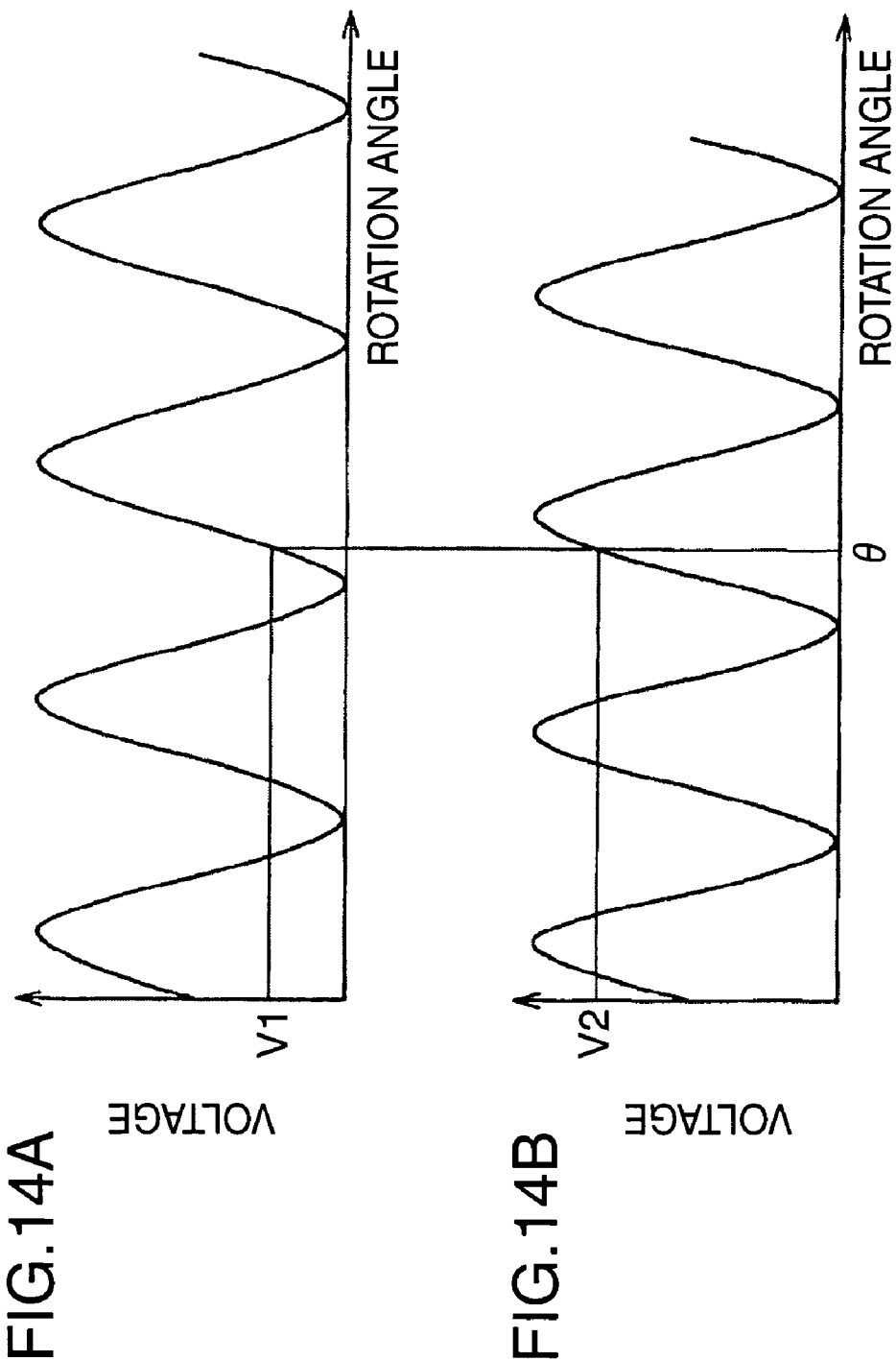
FIGS. 14A and 14B are characteristic diagrams respectively showing a voltage waveform outputted from a first detecting member and a voltage waveform outputted from a second detecting member in the conventional rotation angle detector.

In the foregoing embodiment, the first and second detecting members 12 and 13 are each meshed with the rotary member 1. Alternatively, as shown in FIG. 10, a gear portion 1A of a rotary member 1 is meshed with a gear portion 12A of a first detecting member 12, and a gear portion 13A of a second detecting member 13 is meshed with the gear portion 12A of the first detecting member 12. In such an altered arrangement, the first detecting member 12 and the second detecting member 13 can be arranged in series with respect to the rotary member 1.

In the above altered arrangement as shown in FIG. 10, as compared with the arrangement that each of the first and second detecting members 12 and 13 is directly meshed with the rotary member 1, a first detecting unit 20 and a second detecting unit 21 are arranged in proximity to each other. In such an altered arrangement, counteraction of a magnetic force between the first and second detecting units 20 and 21, which may vary the direction of the magnetic line A1 of the counterpart magnet, can be suppressed greatly by forming at least one of the magnets 14 and 15 into upper and lower sections, and arranging the north pole and the south pole of the upper section in a reversed manner to those of the lower section, as proposed in the present invention.

In the foregoing embodiment, both of the magnets 14 and 15 is constructed such that locations of the north pole and the south pole of upper section 14A, 15A are reversed to those of lower section 14B, 15B. Alternatively, at least one of the magnets 14 and 15 has such an arrangement.

In the foregoing embodiment, the rotary member 1, the first detecting member 12, and the second detecting member 13 are each in the form of a spur gear. As an altered form, a gear other than a spur gear, such as a bevel gear, may be used, or further alternatively, a combination of a projection and a recess other than a gear mechanism may be used.

This application is based on Japanese Patent Application No. 2003-414460 filed on Dec. 12, 2003, the contents of which are hereby incorporated by reference.

Although the present invention has been fully described by way of example with reference to the accompanying drawings, it is to be understood that various changes and modifications will be apparent to those skilled in the art. Therefore, unless such changes and modifications depart from the scope of the present invention hereinafter defined, they should be construed as being included therein.

What is claimed is:

1. A rotation angle detector for detecting a rotation angle of a shaft member, comprising:
   a rotary member which is to be rotated in association with the shaft member;
   a first detection member to be rotated in association with said rotary member;
   a second detection member to be rotated in association with said rotary member;
   a first magnet to be rotated integrally with said first detection member;
   a second magnet to be rotated integrally with said second detection member;
   a first magnetic sensing device opposed to said first magnet;
   a second magnetic sensing device opposed to said second magnet; and
   a controlling circuit for calculating a rotation angle of the shaft member based on detection signals outputted from said first and second magnetic sensing devices,
   wherein said first magnet includes a first section on a side facing said first magnetic sensing device, and a second section on a side facing away from said first magnetic sensing device, with the north pole and the south pole of said first section being arranged in a reversed manner relative to the north pole and the south pole of said second section.

2. The rotation angle detector according to claim 1, wherein
   each of said first and second magnets has a shape of a rectangular parallelepiped.

3. The rotation angle detector according to claim 2, wherein said first detection member has a first recessed portion in a central part thereof and said second detection member has a second recessed portion in a central part thereof, with said first magnet being seated in said first recessed portion and said second magnet being seated in said second recessed portion, and further comprising:

first pressing portions for pressing said first magnet at substantially diagonal positions thereof in opposite and substantially parallel directions to allow said first magnet to be pressingly held in said first recessed portion against opposing side walls of said first recessed portion; and second pressing portions for pressing said second magnet at substantially diagonal positions thereof in opposite and substantially parallel directions to allow said second magnet to be pressingly held in said second recessed portion against opposing side walls of said second recessed portion.

4. The rotation angle detector according to claim 3, further comprising:

a first magnet holding member for fixedly holding said first magnet in said first recessed portion, with said first pressing portions being on said first magnet holding member; and a second magnet holding member for fixedly holding said second magnet in said second recessed portion, with said second pressing portions being on said second magnet holding member.

5. The rotation angle detector according to claim 4, wherein said first magnet holding member includes a first base portion having a shape corresponding to a cross-sectional shape of said first magnet, and also includes a first hook portion extending from said first base portion in a direction orthogonal to the opposite and substantially parallel directions in which said first magnet is pressed by said first pressing portions at the substantially diagonal positions thereof, and said second magnet holding member includes a second base portion having a shape corresponding to a cross-sectional shape of said second magnet, and also includes a second hook portion extending from said second base portion in a direction orthogonal to the opposite and substantially parallel directions in which said second magnet is pressed by said second pressing portions at the substantially diagonal positions thereof.

6. The rotation angle detector according to claim 5, wherein said first base portion has a first projection that contacts said first magnet so as to press said first magnet against said first detection member, and said second base portion has a second projection that contacts said second magnet so as to press said second magnet against said second detection member.

7. The rotation angle detector according to claim 6, wherein said rotary member comprises a first spur gear, said first detection member comprises a second spur gear, and said second detection member comprises a third spur gear.

8. The rotation angle detector according to claim 7, wherein an amount of teeth of said first spur gear is different from an amount of teeth of said second spur gear, an amount of teeth of said first spur gear is different from an amount of teeth of said third spur gear, and an amount of teeth of said second spur gear is different from an amount of teeth of said third spur gear.

9. The rotation angle detector according to claim 8, wherein said teeth of said first spur gear are meshed with said teeth of said second spur gear and said teeth of said third spur gear.

10. The rotation angle detector according to claim 8, wherein said teeth of one of said second and third spur gears are meshed with said teeth of said first spur gear and said teeth of the other of said second and third spur gears.

11. The rotation angle detector according to claim 3, wherein said substantially diagonal positions of said first magnet correspond to two diagonal corner portions of said first magnet such that said first magnet is to be pressingly held in said first recessed portion against opposing side walls of said first recessed portion by having another two diagonal corner portions of said first magnet be pressed against said opposing side walls, respectively, and said substantially diagonal positions of said second magnet correspond to two diagonal corner portions of said second magnet such that said second magnet is to be pressingly held in said second recessed portion against opposing side walls of said second recessed portion by having another two diagonal corner portions of said second magnet be pressed against said opposing side walls, respectively.

12. The rotation angle detector according to claim 1, wherein said rotary member comprises a first spur gear, said first detection member comprises a second spur gear, and said second detection member comprises a third spur gear.

13. The rotation angle detector according to claim 12, wherein an amount of teeth of said first spur gear is different from an amount of teeth of said second spur gear, an amount of teeth of said first spur gear is different from an amount of teeth of said third spur gear, and an amount of teeth of said second spur gear is different from an amount of teeth of said third spur gear.

14. The rotation angle detector according to claim 13, wherein said teeth of said first spur gear are meshed with said teeth of said second spur gear and said teeth of said third spur gear.

15. The rotation angle detector according to claim 13, wherein said teeth of one of said second and third spur gears are meshed with said teeth of said first spur gear and said teeth of the other of said second and third spur gears.

16. The rotation angle detector according to claim 1, further comprising:

a first magnet holding member for fixedly holding said first magnet in said first recessed portion, and a second magnet holding member for fixedly holding said second magnet in said second recessed portion.

17. The rotation angle detector according to claim 16, wherein said first magnet holding member includes a first base portion having a shape corresponding to a cross-sectional shape of said first magnet, and also includes a first hook portion extending orthogonally from said first base portion, and said second magnet holding member includes a second base portion having a shape corresponding to a cross-sectional shape of said second magnet, and also includes a second hook portion extending orthogonally from said second base portion.

18. The rotation angle detector according to claim 17, wherein said first base portion has a first projection that contacts said first magnet so as to press said first magnet against said first detection member, and said second base portion has a second projection that contacts said second magnet so as to press said second magnet against said second detection member.

19. The rotation angle detector according to claim 1, wherein said first magnetic sensing device is mounted on a wiring substrate at a position opposing said first detection member, and said second magnetic sensing device is mounted on said wiring substrate at a position opposing said second detection member.

20. The rotation angle detector according to claim 1, wherein the shaft member includes a steering shaft for use in an automotive vehicle.

* * * * *